United States Patent [19]

Lund

[11] 3,967,665
[45] July 6, 1976

[54] ADJUSTABLE ROUTING TEMPLATE

[76] Inventor: Allan M. Lund, 515 E. Adams, Riverton, Wyo. 82501

[22] Filed: Oct. 2, 1974

[21] Appl. No.: 511,446

[52] U.S. Cl. .......................... 144/144.5 R; 144/323
[51] Int. Cl.² ....................................... B27G 23/00
[58] Field of Search ............ 144/27, 136 R, 136 G, 144/144, 144.5, 197, 323; 90/12 D

[56] References Cited
UNITED STATES PATENTS

| | | | |
|---|---|---|---|
| 2,949,948 | 8/1960 | Zern | 144/323 |
| 3,402,640 | 9/1968 | Eisenbach | 144/27 X |
| 3,519,043 | 7/1970 | Guill | 144/144.5 |

*Primary Examiner*—Al Lawrence Smith
*Assistant Examiner*—Gary L. Smith
*Attorney, Agent, or Firm*—Reilly and Hancock

[57] ABSTRACT

A routing template assembly has been devised which is specifically adaptable for routing out slots of different widths in panels, boards and the like, such as for example, in forming slots in side wall supports for insertion of shelf sections. The template is characterized by a slotting guide which is adjustable in width depending upon the width of slot to be formed, adjustment being accomplished by setting the spacing between spaced parallel guide edges of the slotting guide to correspond to the desired width of the slot plus the diameter of the router guide bushing less the diameter of the routing bit.

6 Claims, 10 Drawing Figures

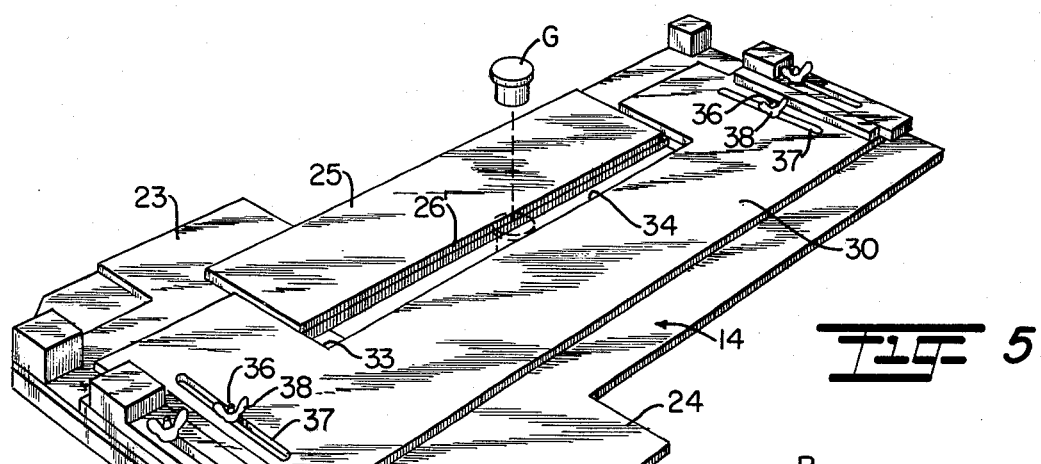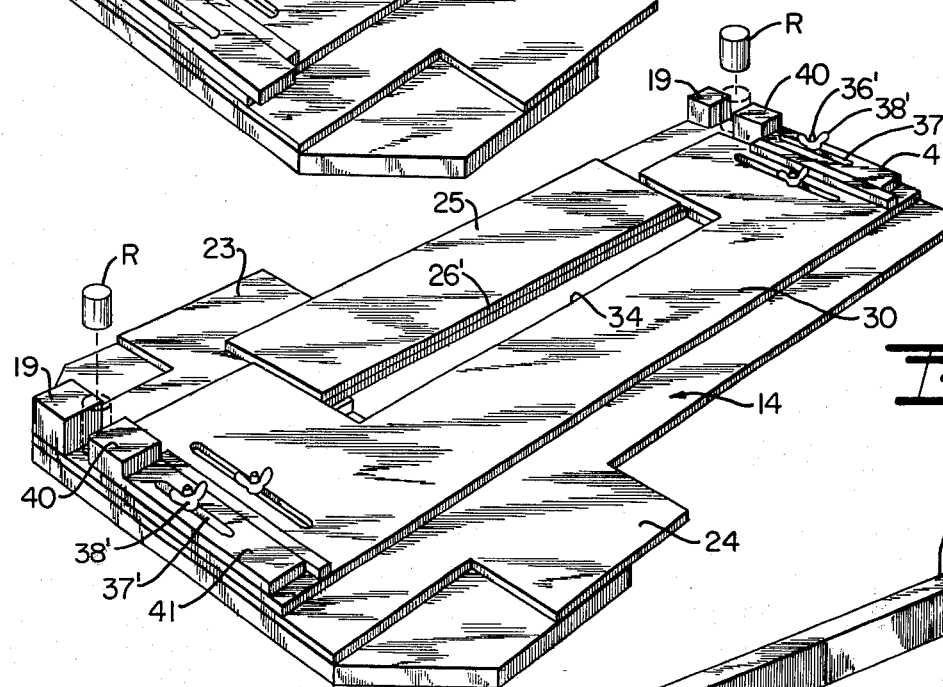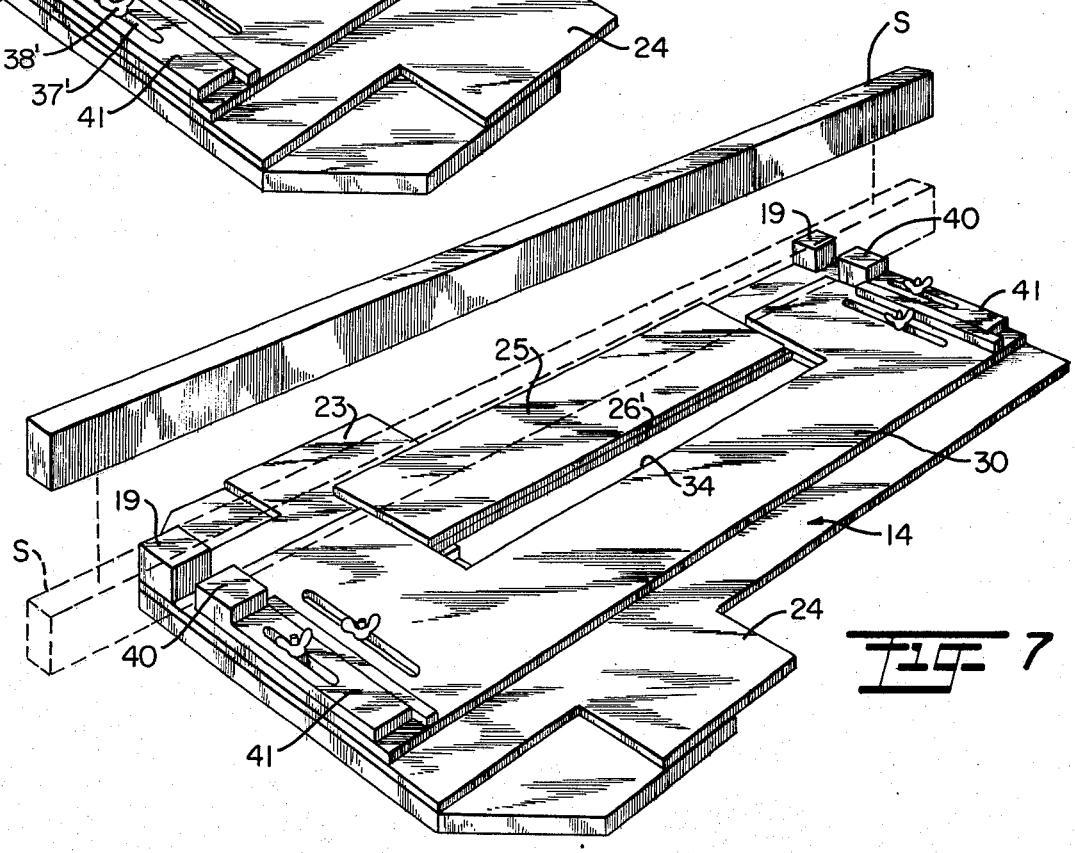

ADJUSTABLE ROUTING TEMPLATE

This invention relates to novel and improved routing jigs; and more particularly relates to a novel and improved method and apparatus for guiding a router and the like in the formation of slots of different widths, such as, in the construction of wooden shelving and other furniture.

BACKGROUND OF THE INVENTION

In the construction of shelf units, formation of slots of the desired width for insertion of the shelving has in the past been quite tedious and time-consuming for the carpenter. The shelf sections often vary slightly in thickness and accurate measurement is required to assure that each slot is formed of a width to assure tight-fitting insertion of the shelf board. Moreover, in forming a series of slots in the side wall supports for the shelving unit, it is important that the desired spacing be established between slots, and again, each slot must be of a specific desired width for tight-fitting insertion of each shelf board; further, the slot should be accurately squared with respect to the length of the board so as to assure accurate alignment of the shelf sections in spaced parallel relation to one another.

It is therefore highly desirable that a jig be provided for use by a carpenter which will serve as an aid in quickly and accurately forming slots of the desired width in the end panels or wall supports of a shelf unit which is portable, lightweight, simplified in construction and easy to use. Moreover, it is desirable that the jig be so constructed and arranged as to permit advancement of the board to be slotted into position, clamped down, and a slot of the desired width formed by insertion of a router with guide bushing through an adjustable guide opening provided in the jig wherein the width of the guide opening is set by the thickness of the board to be inserted in the slot.

SUMMARY OF THE INVENTION

It is therefore an object of the present invention to provide for a novel and improved routing jig specifically adaptable for forming slots of desired widths and depths.

It is another object of the present invention to provide a jig for routing slots or grooves of the desired width and length in an accurate, rapid and dependable manner.

A further object of the present invention is to provide a portable routing jig comprised of a minimum number of parts and of simple but sturdy construction which is readily adjustable for use with any size router bit and guide bushing and is further adjustable for formation of any width of slot from the smallest bit size; and further wherein a slotting guide provided in the jig for insertion of the router bit has its width set in a unique manner by the thickness of the material to be inserted into the slot plus the diameter of the guide bushing less the diameter of the router bit in order to determine the width of slot formed.

An additional object of the present invention is to provide for a novel and improved router guide template assembly having a slotting guide therein which is precisely adjustable in forming slots of a desired width to accommodate a particular size and thickness of material to be inserted and is rapidly and accurately adjustable in use.

In accordance with the present invention, a routing jig adaptable for forming slots in end panels or wall supports of a shelf unit to accommodate each shelf section or board is broadly characterized by including a stationary frame having a workpiece-receiving area for insertion of the end panel to be slotted and a stationary guide edge overlying the workpiece-receiving area. Adjustably mounted on the stationary frame is a template or jig which includes a second guide edge arranged in coplanar spaced parallel relation to the stationary guide edge so as to define a common slotting guide therebetween. Adjustment means to regulate the width of the sliding guides serve to adjust the size of the guide in a unique manner by setting the spacing between guide edges to correspond to the desired width of the slot to be formed plus the diameter of the router guide bushing less the diameter of the router bit in order to compensate for the thickness of the guide bushing. As a result, when the router bit is inserted with the guide bushing into the slotting guide and the guide bushing caused to advance along each guide edge, the router bit will form a slot of the desired width in the workpiece. Moreover, by setting the width of the slotting guide in the manner described, the thickness of the material can be employed directly as a means of measurement and direct adjustment of the spacing width between the guide edges so as to assure greater accuracy and reliability in setting the width of the slotting guides.

The above and other objects, advantages and features of the present invention will become more readily appreciated and understood from a consideration of the following detailed description of a preferred form of the present invention when taken together with the accompanying drawings, in which:

BRIEF DESCRIPTION OF THE DRAWINGS

FIGS. 5 to 8 illustrate in a sequence of steps the method carried out in accordance with the present invention for adjusting the slotting guide for routing a slot in a workpiece of predetermined width.

Figure 1:
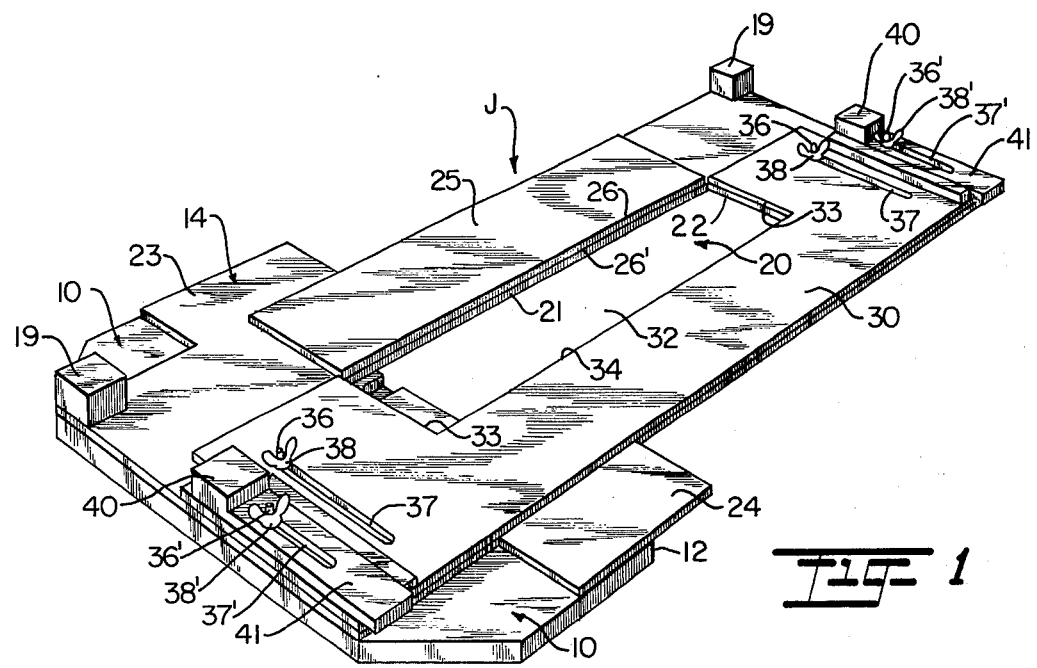
FIG. 1 is a perspective assembly view of a preferred form of the present invention.
Figure 2:
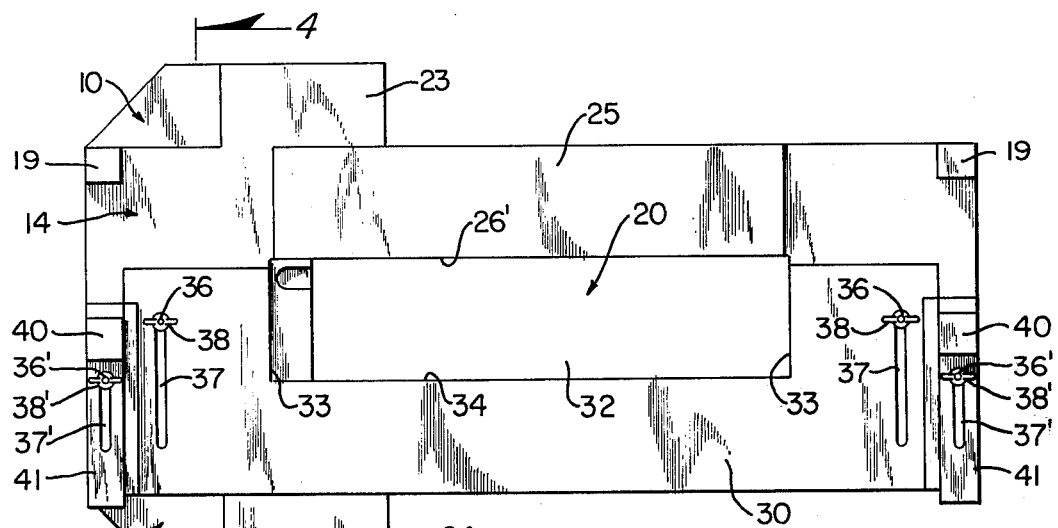
FIG. 2 is a plan view showing the preferred form of the present invention with the slotting guide shown in the fully opened position.
Figure 3:
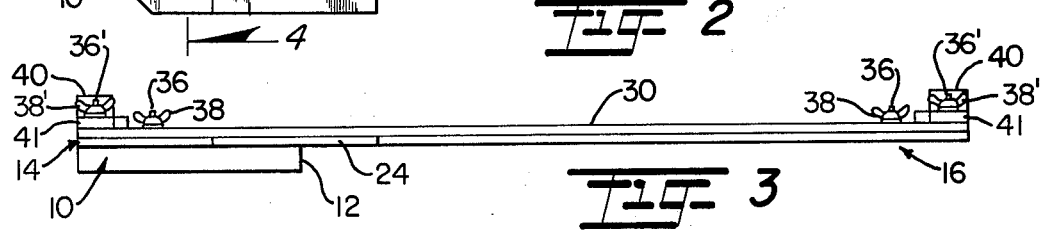
FIG. 3 is a front view in elevation of the preferred form of present invention.
Figure 4:
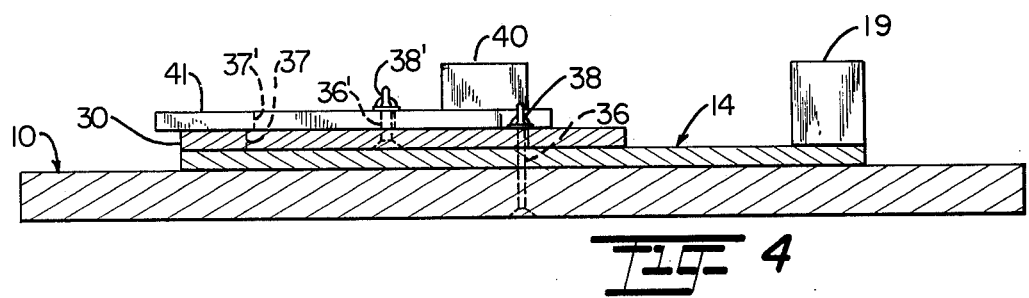
FIG. 4 is a cross-sectional view taken about lines 4—4 of FIG. 2.

Referring in more detail to the drawings, there is shown by way of illustrative example in FIGS. 1 to 4 a preferred form of jig which is generally designated J and which is comprised of a base section 10 having a squaring edge 12 and an overlying stationary template portion 14 projecting laterally from the base portion and defining a workpiece-receiving area 16. The stationary template 14 has a pair of upstanding stationary block members 19 at opposite front corners thereof, and a central generally rectangular cut-out portion 20 is defined by front and rear stationary guide edges 21 and edges 22 at opposite ends. Front and rear extension plates 23 and 24 respectively, are formed integrally with and extend from the body of the template 14. In addition, a raised rectangular section defines a guide member 25 having a guide edge 26 which is aligned to be flush with the lower front guide edge 21 to define a common guide edge hereafter designated 26'.

An adjustable template is made up of a flat plate 30 which overlies the stationary template 14 and is of length corresponding to the length of the stationary template. The adjustable template 30 has a central generally rectangular cutout portion 32 provided with opposite ends 33 and an adjustable guide edge 34, the opposite edges 33 being spaced apart a distance to permit their passage beyond opposite ends of the stationary guide member 25. The adjustable template 30 is adjustably mounted upon the stationary template by suitable tightening members in the form of screws 36 projecting upwardly from the stationary template through elongated slots 37 at opposite ends of the adjustable template, the slots 37 extending in a direction transversely to the length of the cutout portion 32. Wing nuts 38 are threaded onto the upwardly projecting ends of the screws 36 to permit the adjustable template to be tightened against the stationary template. In a similar fashion, adjustable sizing blocks 40 including rearwardly extending extension plates 41 are fastened by outer tightening members generally designated at 42 and which correspond to the inner tightening members for the adjustable template each including a screw 36' projecting through a slotted portion 37' and a wing nut 38'. The blocks 40 are thereby disposed for slidable forward and rearward movement both independently of and together with the adjustable template 30 and are aligned for movement into and away from abutment with the stationary sizing blocks 19 to aid in selecting the width of the slot to be formed in a manner to be hereinafter described.

Figure 8:
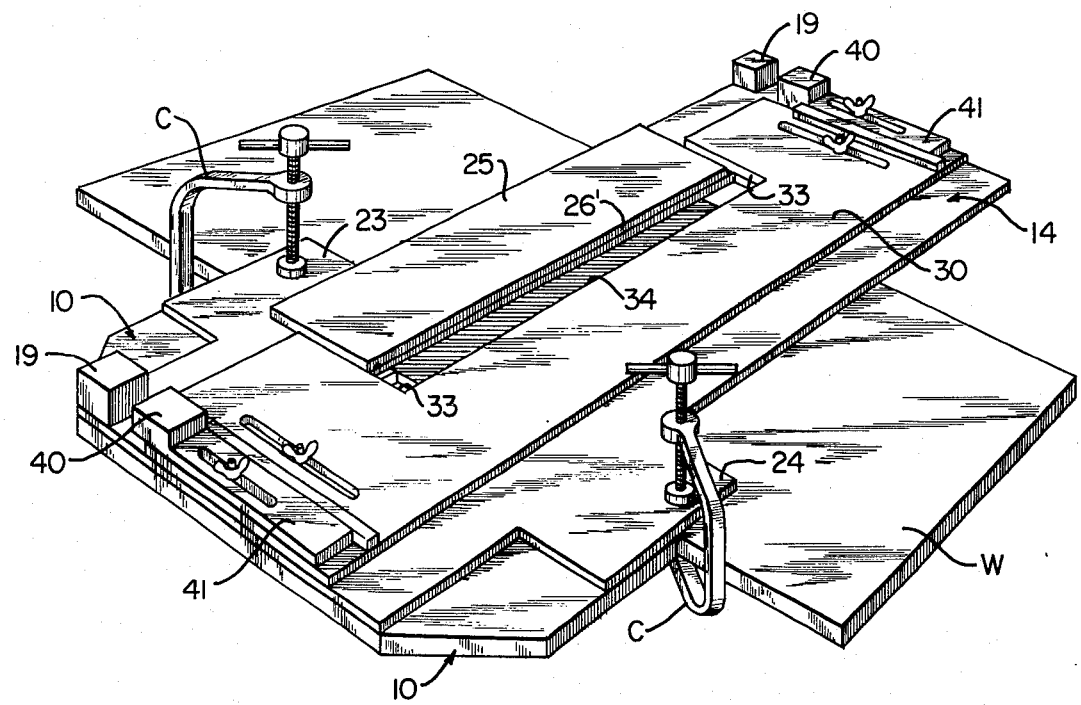
Figure 9:
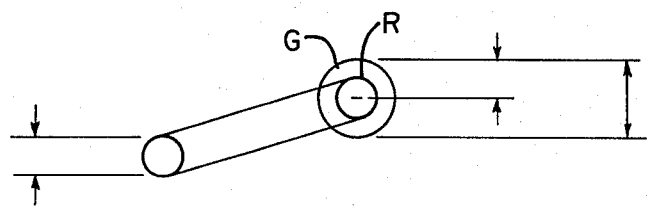
FIG. 9 is a plan view of a conventional guide bushing and routing bit illustrating the difference in width therebetween.
Figure 10:
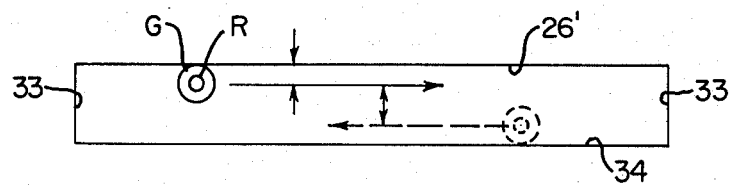
FIG. 10 is a somewhat schematic view illustrating the traversal of a conventional router along the slotting guide in accordance with the present invention.

It will be seen that the base portion 10 in cooperation with the fixed template 14 defines a generally T-shaped square for the specific purpose of permitting longitudinal advancement of a rectangular board through the workpiece-receiving area 16 along the squared edge 12 directly beneath the slotting guide formed between the edges of the central cutout portions 20 and 32. Referring to FIGS. 9 and 10, an important feature of the present invention is to devise a way in which the slotting guide will permit traversal of a conventional guide bushing G with a routing bit R to form a slot of predetermined depth in the workpiece, or board, W, as illustrated in FIG. 8. Specifically, and as a setting for the present invention, in forming slots in the vertical side panels of a shelf unit, each slot must be accurately formed of a specific width corresponding to the thickness of the shelf board to be inserted therein. While boards generally come in standard thickness, they are subject to slight variations; yet it is extremely important that the width of the slot closely conform to the thickness of the board in order to assure tight-fitting insertion therein.

The routing jig of the present invention is designed in such a way as to permit setting of the width of the slotting guide so as to permit traversal of the guide bushing G along the spaced parallel guide edges 26' and 34 between the fixed and adjustable templates so that upon completion, the slot width formed in the workpiece W will precisely conform to the thickness of the board to be inserted therein. To this end, the slotting guides can be adjusted by loosening the wing nuts 38 to the inner tightening means whereby to slide the adjustable template 30 until the space formed between the guide edges 20 and 32 equals the diameter of the guide bushing G plus the thickness of the workpiece W less the diameter of the router bit. This system of setting the spacing or width of the slotting guides permits accurate setting directly in accordance with the thickness of the board while compensating for the additional thickness of the guide bushing as it is advanced along opposite guide edges between the fixed and adjustable templates. This particular technique for setting the jig will be most readily understood from the following description of the preferred method of the present invention as illustrated in FIGS. 5 to 8.

In carrying out the method of the present invention, FIG. 5 illustrates the first adjusting step in which the inner tightening means for the adjustable template 30 are loosened, and a guide bushing G to be used in forming a particular width of slot is inserted between the guide edges. The adjustable template 30 is then advanced until the guide edges 20' and 34 firmly engage opposite diametrical surfaces of the guide bushing, and the inner tightening means are then tightened.

As illustrated in FIG. 6, router bit R to be employed in forming a particular width slot is sequentially inserted between each set of the sizing blocks or stops 19 and 40 at opposite ends of the jig, and each adjustable sizing block 40 is advanced until the router bit is clamped against the stationary sizing block. It is important to note that this is done while the adjustable template remains fixed against the stationary template and done specifically for the purpose of compensating for the difference in diameter between the guide bushing G and router bit R.

The next step, as illustrated in FIG. 7, shows the inner tightening means once again loosened while the outer tightening means remains fixed and either a shelf section or scrap boards S is inserted between the adjustable and permanent bit sizing stops. Of course, the scrap board must be of the same stock and thickness as the shelf section or board to be mounted in the finished slot. The adjustable template is advanced until the boards are held firmly between the bit sizing stops and the outer tightening members clamped down.

FIG. 8 illustrates the jig ready for use by laying it over the board or workpiece W to be slotted with the squaring edge firmly against the edge of the workpiece and clamped down with clamps designated C. The router with the template guide and bit installed is inserted in the slotting guide and the router is advanced transversely across the workpiece first in one direction with the guide bushing advanced along one of the guide edges 26' and 34, then returned in the opposite direction along the opposite guide edge. As a result of the difference in spacing established between the slotting guide and desired width of the slot, the router bit will in two passes along opposite guide edges form a slot of the desired width. In other words, the router bit will form one-half the width of the slot in each pass.

For the purpose of illustration and not limitation, the preferred form of jig can be adjusted to form slots over a wide range in sizes and can be made up for the slot length desired by suitable dimensioning of the length of the template and cutout portions.

Although the present invention has been described specifically in relation to the formation of straight elongated slots, its ready conformability for use in forming slots of other configurations will be readily appreciated. In order to regulate the depth of slot, a thickner guide 25 and template 30 may be employed. Of course, it will be readily appreciated that a permanent clamping device may be employed in place of the C-clamps C and metal gauges may be employed in place of the router bit in compensating for the diameter of the router bit in controlling the width of the slotting guides.

It is therefore to be understood that while a preferred method and apparatus has been hereinbefore set forth and described, various modifications and changes may be made therein without departing from the spirit and scope of the present invention as defined by the appended claims.

What is claimed is:

1. In apparatus for routing elongated slots in a workpiece in which a router bit is adapted to be inserted through a guide bushing, the combination comprising:
   a stationary frame including a workpiece-receiving area and a stationary guide in overlying relation to the workpiece-receiving area in which the guide edge extends in a direction parallel to the intended length of the slot to be formed;
   adjustable template means mounted on said stationary frame including a second adjustable guide edge disposed in coplanar spaced parallel relation to said stationary guide edge, said stationary and adjustable guide edges defining guide opening means therebetween in overlying relation to the workpiece for guiding the router guide bushing along the guide edges to form a slot or predetermined width in the workpiece; and
   adjustment means between said adjustable template and said stationary frame to position said adjustable guide edge with respect to said stationary guide edge at a spacing corresponding to the intended width of the slot to be formed in the workpiece plus the diameter of said guide bushing less the diameter of said router bit, said adjusting means including adjustable sizing means between said adjustable template means and said frame movable a first distance independently of said adjustable template means and being further movable a second distance in the same direction as the direction of movement for the first distance to cause movement of said adjustable template means over a distance corresponding to the second distance 2. In apparatus according to claim 1, said stationary frame having a workpiece-receiving area defining a longitudinal guide path for movement of an elongated workpiece lengthwise therethrough, said stationary and adjustable guide edges extending transversely of the length of the workpiece.

3. In apparatus for routing elongated grooves in a workpiece in which a router bit is adapted to be inserted through a guide bushing, the combination comprising:
   a stationary frame including a workpiece-receiving area in which the guide edge extends in a direction parallel to the intended length of the slot to be formed;
   adjustable template means mounted on said stationary frame including a second adjustable guide edge disposed in coplanar spaced parallel relation to said stationary guide edge, said stationary and adjustable guide edges defining guide opening means therebetween in overlying relation to the workpiece for guiding the router guide bushing along each of the guide edges to form a resultant groove of predetermined width in the workpiece; and
   inner and outer adjustment means between said adjustable template and said stationary frame, said inner adjustment means disposed between said adjustable template means and said frame, said outer adjustment means defined by adjustable sizing means on said adjustable template means movable a first distance independently of said adjustable template means corresponding to the diameter of said router bit and being further movable in the same direction as the first distance for a second distance to cause corresponding movement of said adjustable template means when said inner adjustment means is loosened to permit movement of said adjustable template means a distance corresponding to the width of the groove less the diameter of said router bit.

4. In apparatus according to claim 3, said stationary frame having a workpiece-receiving area defining a longitudinal guide path for movement of an elongated workpiece lengthwise therethrough, said stationary and adjustable guide edges extending transversely of the length of the workpiece, there being inner and outer adjustment means at opposite ends of said guide edges.

5. In apparatus according to claim 3, said outer adjustment means being defined by a stationary sizing block and an adjustable sizing block movable in a direction toward and away from said stationary block normal to the guide edges.

6. The method of routing a slot in a shelf unit and the like, comprising the steps of:
   a. placing a template having an adjustable guide opening therein over a workpiece in which a slot of the desired width is to be formed;
   b. setting the width of the slot in one direction of movement between the guide edges to conform to the diameter of the guide bushing for a router bit to be employed in forming the slot;
   c. increasing the width of the slot in the same direction of movement as in step (b) an additional distance to conform to the width of the shelf to be inserted into the slot less the width of the router bit;
   d. fixing the spacing between the guide edges; and
   e. advancing the router within the guide bushing along each guide edge with the router bit extending through the opening formed therebetween to form a resultant slot of the desired width in the workpiece.

\* \* \* \* \*

PO-1050
(5/69)

UNITED STATES PATENT OFFICE
CERTIFICATE OF CORRECTION

Patent No. __3,967,665__          Dated __6 July, 1976__

Inventor(s) __Allan M. Lund__

It is certified that error appears in the above-identified patent and that said Letters Patent are hereby corrected as shown below:

Column 3, line 1, after "24" add --,--.

Column 3, line 8, after "of" add --a--.

Column 3, line 55, cancel "thickness" and substitute --thicknesses--.

Column 4, line 1, cancel "to" (first occurrence) and substitute --of--.

Column 4, line 21, cancel "20'" and substitute --26'--.

In The Claims:

Column 5, line 30, cancel "or" and substitute --of--.

Signed and Sealed this

Twenty-eighth Day of September 1976

[SEAL]

Attest:

RUTH C. MASON
Attesting Officer

C. MARSHALL DANN
Commissioner of Patents and Trademarks